(12) United States Patent
Thanu et al.

(10) Patent No.: US 7,418,460 B2
(45) Date of Patent: Aug. 26, 2008

(54) METHOD AND SYSTEM FOR ENABLING UNDO ACROSS OBJECT MODEL MODIFICATIONS

(75) Inventors: Lakshmi Narayanan Thanu, Sammamish, WA (US); Peter Eberhardy, Seattle, WA (US); Vijay Govind Baliga, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 478 days.

(21) Appl. No.: 10/969,252

(22) Filed: Oct. 19, 2004

(65) Prior Publication Data

US 2006/0085486 A1    Apr. 20, 2006

(51) Int. Cl.
*G06F 17/30* (2006.01)
(52) U.S. Cl. ............... 707/200; 707/104.1; 707/103 R; 707/100; 714/19
(58) Field of Classification Search ............ 707/1, 707/100, 103 R, 200; 719/200, 320
See application file for complete search history.

(56) References Cited

U.S. PATENT DOCUMENTS 4,821,228 A * 4/1989 Wickes et al. ............... 708/530
6,111,575 A * 8/2000 Martinez et al. ............ 715/810
6,166,739 A * 12/2000 Hugh ......................... 715/854
2003/0195899 A1* 10/2003 Tsao ......................... 707/104.1
2005/0120214 A1* 6/2005 Yeates et al. ............... 713/171

OTHER PUBLICATIONS

David Eppstein, How to implement the Undo/Redo Framwork, Feb. 8, 2003 http://groups.google.com/group/comp.lang.python/browse_thread/thread/87d5aa221785dc47/45a4eb65e0ae0154?lnk=st&q=undo+stack&mum=15&gk=en.*
http://www.mirrorservice.org/sites/ftp.uib.no/pub/vi/comp.editors/undo, Jul. 27, 1992.*
http://web.archive.org/web/20050426052732/exceltips.vitalnews.com/pages/T0140_Preserving_the_Undo_List.html, Apr. 26, 2005.*

* cited by examiner

*Primary Examiner*—Christian P. Chace
*Assistant Examiner*—Kellye Anderson
(74) *Attorney, Agent, or Firm*—Merchant & Gould P.C.

(57) ABSTRACT

A method and system provides reversibility of an operation performed by a user of an application program and associated with a modification to an object model of the application program, such as a spreadsheet program or other office productivity application program. The top item of a first undo stack associated with the application program is determined, saved, and copied to a second stack functioning as a replicated undo stack. According to one aspect of the invention, such steps are performed prior to calling an object model method that clears the first undo stack. The top item of the second replicated undo stack is placed back onto the first undo stack.

18 Claims, 3 Drawing Sheets

METHOD AND SYSTEM FOR ENABLING UNDO ACROSS OBJECT MODEL MODIFICATIONS

BACKGROUND OF THE INVENTION

Microsoft® Excel, part of the Microsoft® Office application suite, is one of the best-known examples of an office productivity application program. Excel is a menu-driven spreadsheet system that enables a user to create reports for manipulation and analysis of data. An Excel worksheet includes a grid of cells that specify particular constraints imposed on data. A cell may include a constant data value or a formula that evaluates to a data value. An important feature of certain office productivity applications, including Excel and other Microsoft® Office applications, is their capacity to be extended by macro commands and "add-ins". In Excel, a macro is a series of commands stored as a Microsoft® Visual Basic® module. Add-ins are supplemental programs that provide enhanced, optional or customized features.

Office productivity applications typically provide the user with some ability to undo commands or actions performed by the user by way of the application user interface, and to redo undone actions. For example, when an Excel user types a value into a worksheet cell, this input action ordinarily can be undone, either by clicking "Undo" on the Edit menu or by using an Undo tool on the standard toolbar. In such applications, the undo operation is typically implemented by way of a stack. The items on the undo stack represent tracked, reversible user interface operations. Ordinarily, at a given time the top item on the undo stack is available to be undone. Each other item on the undo stack cannot be undone until it becomes the top of the stack.

In Excel and similarly-designed programs, operations associated with macros and add-ins that interact with the object model exposed by the application are not automatically tracked in the undo stack. In the Excel object model, an item can be set as the next item available for Undo (that is, the item is pushed on the stack). By design, most modifications to the Excel object model clear the Excel undo stack as a side effect. Thus, pushing an item on the undo stack causes that item to become the sole item on the stack. This may be undesirable for the user because, in the course of ordinary user interaction with an add-in, object model modifications that occur typically do not change the state of the spreadsheet as experienced by the user. Undoable operations are thus not treated in a consistent manner.

SUMMARY OF THE INVENTION

Embodiments of the present invention are related to a method and system for providing reversibility of an operation performed by a user of an application program and associated with a modification to an object model of the application program. The top item of a first undo stack associated with the application program is determined, saved, and copied to a second stack functioning as a replicated undo stack. According to one aspect of the invention, such steps are performed prior to calling an object model method that clears the first undo stack. The top item of the second replicated undo stack is placed back onto the first undo stack. The application program may be, for example, an office productivity application program, such as a spreadsheet program.

DETAILED DESCRIPTION OF THE INVENTION

In the following detailed description together with the accompanying drawings, embodiments of the invention are described in sufficient detail to enable those having ordinary skill in the art to practice the invention. It is to be understood that other embodiments may be used, and changes may be made, without departing from the spirit or scope of the present invention. The following detailed description is, therefore, not to be taken in a limiting sense, and the scope of the present invention is defined only by the appended claims.

In general, embodiments of the present invention are related to a method and system for enabling one or more levels of items on an application's undo stack or the equivalent to remain available despite modifications to an application object model or other events associated with the application that have the effect of clearing the application's undo stack. In one embodiment, the last item that was available on the top of the undo stack remains available. In an alternative embodiment multiple undo items are preserved. The present invention will be described particularly with reference to embodiments associated with Excel and the Excel object model. It should be understood that the invention is more broadly applicable to computers running other application programs, including other spreadsheet programs and other office productivity applications, that are designed similarly to Excel with respect to the undo operation.

Figure 2:
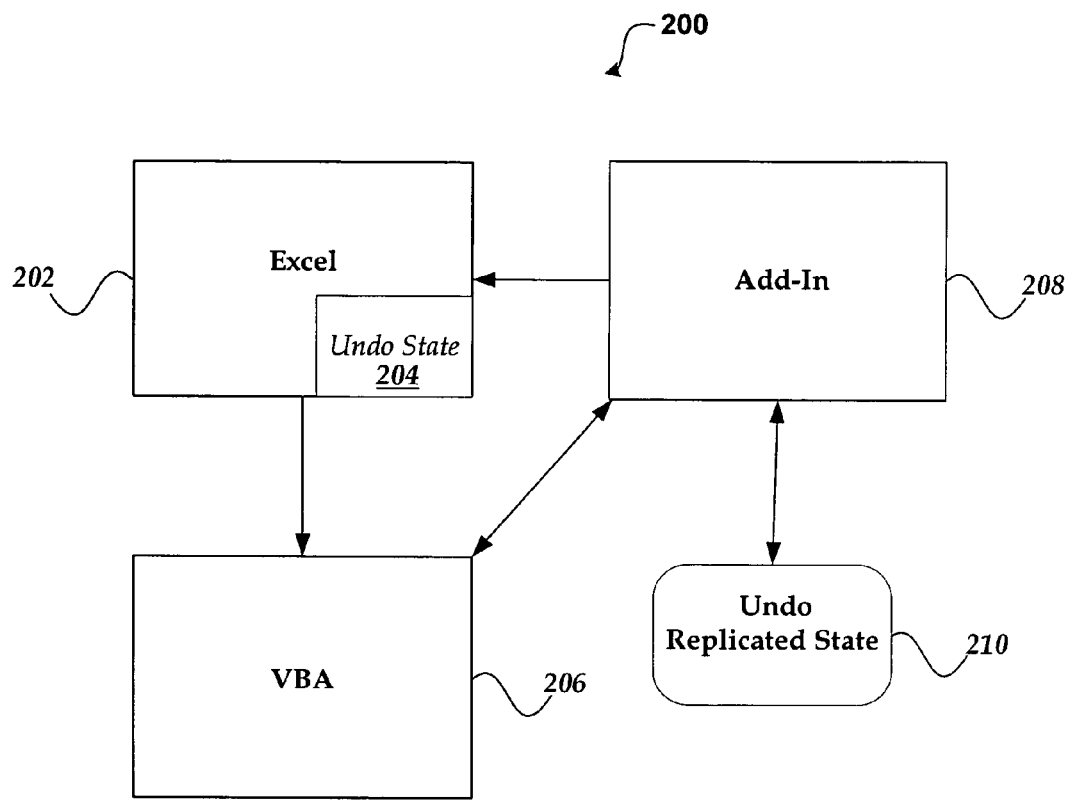
FIG. 2 is a block diagram illustrating components of a system in which an exemplary embodiment of the present invention is situated.

FIG. 2 illustrates certain components of a system 200 in which an exemplary embodiment of the present invention may be situated. As illustrated, the system includes the executable Excel spreadsheet system 202. As noted above, in alternative embodiments of the invention other spreadsheet programs or other applications are present. The Excel component conceptually includes the state of the undo stack 204. The system 200 further includes a Visual Basic® for Applications (VBA) runtime subsystem 206, associated with a dynamically linked library or the like, with which the Excel application 202 interacts. The system 200 additionally includes an add-in component 208 as described above. The add-in 208 interacts with Excel 202 and the VBA runtime 206. The system 200 further includes a component 210 representing the effort to replicate the supposed state of the Excel undo stack, tracking operations performed by, for example, the add-in component 208, as described further below.

Figure 3:
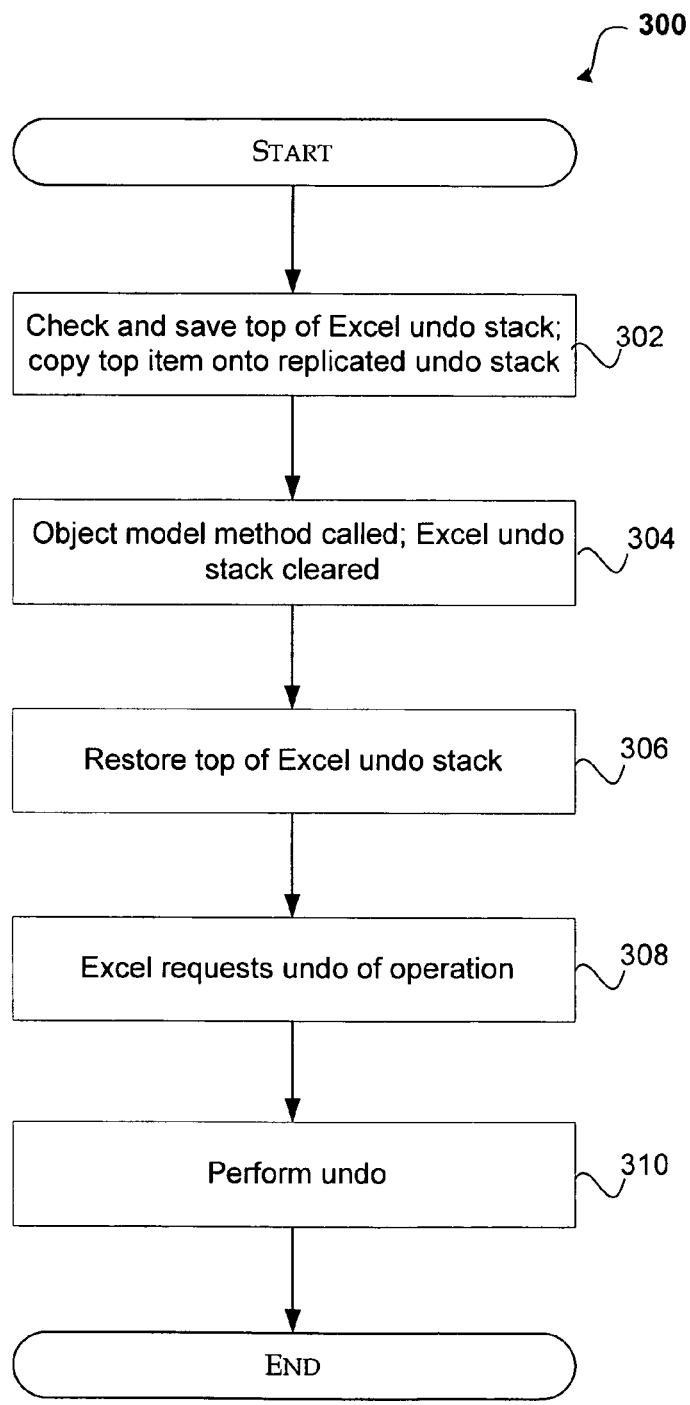
FIG. 3 illustrates a process for enabling a consistent undo operation across object model modifications, in accordance with aspects of the invention.

FIG. 3 provides a flow diagram 300 that illustrates a process for maintaining state information regarding undoable operations across object model modifications, in accordance with aspects of the present invention. At step 302 the content of the top of the Excel undo stack is determined and saved, and the top item is copied onto a second replicated stack of undoable operations. These actions are performed before beginning an operation that is associated with modification to the object model. They can also be performed before any Excel event.

Excel does not provide a direct method to read the top of its undo stack; it provides only a mechanism to set the top of the stack. However, when the top of the undo stack is set, the text of the undo menu item that is visible to the user is changed. By parsing this text and maintaining a mapping of text to recognized reversible operations, one can determine the operation that is on the top of the undo stack. When adding custom undoable operations to the undo stack it is thus preferable for the operations to be associated with recognizable names. In one aspect of the invention, to determine the menu item corresponding to the top of the undo stack, an Excel::Application object is obtained. The "Worksheet Menu Bar" in the Office::_CommandBar collection on that object is found. The "Edit"_CommandBarPopup in the Control collection of the Office::_CommandBar has another Office::_CommandBar collection in which the "Undo" and "Redo" Office::_CommandBarButtons. From this the Caption, comprising a text string, is parsed.

Returning to the flow diagram of FIG. 3, at step 304 an object model method is called and the undo stack is cleared by the Excel application. At step 306 the top of the Excel undo stack is restored by placing the top item in the replication stack onto the Excel undo stack. This is done by a call to OnUndo in the Excel::Application object with the name of a VBA macro and the menu text to display. Optionally, OnRepeat can be given a VBA macro and menu text. By reading the Excel undo stack before object model methods are called (and after every Excel event that adds to the undo stack) an add-in can derive the full state of the Excel undo stack. Thus, after an object model method is called and the stack is cleared, it is possible to read the internal derivation of the undo stack and put the undoable operations discovered back on the Excel stack as needed.

As shown at step 308, Excel requests an undo (or redo) of the operation. At step 310 the undo or redo is performed. The replication stack is checked, and the top item, if any, is placed on the top of the Excel stack. The mechanism provided by Excel to set the top of the undo stack has further limitations. It can only be a VBA macro, and it will be called for both undo and redo. Therefore it is important to maintain a redo stack as well, so that the macro can adapt to the context in which it has been called. Items appear first on the undo stack, and after undo is executed the items get moved to the redo stack, so if the same item is called a second time it is a redo. After redo, items get moved back to the undo stack, and so on, until a new item is added to the undo stack when the redo stack is finally cleared. Excel calls the VBA macro automatically; the only calls to make in the Excel object model are to implement the operation.

For custom operations it is not necessary to embed all information regarding the operation into the menu text. A separate macro may be created for each item added to the undo stack. In this way, the information is embedded in the macro. When the macro runs, this information can be used to verify again that the state of the derived undo stack matches the actual Excel undo stack.

If a non-VBA add-in is being used, an entry point must be defined in the code so that the generated VBA macro can call into it. The only information needed in the VBA macro is a unique identifier. This identifier is used by the add-in to look up the actual operation. Because the VBA is user-modifiable, this also provides better protection to ensure that the undo/redo mechanism is not inadvertently or deliberately tampered with to produce incorrect results. One approach is to use the identifier in the VBA macro itself. Because Excel has knowledge of this value, it is even more impractical for the user to tamper with the VBA.

Illustrative Operating Environment

Figure 1:
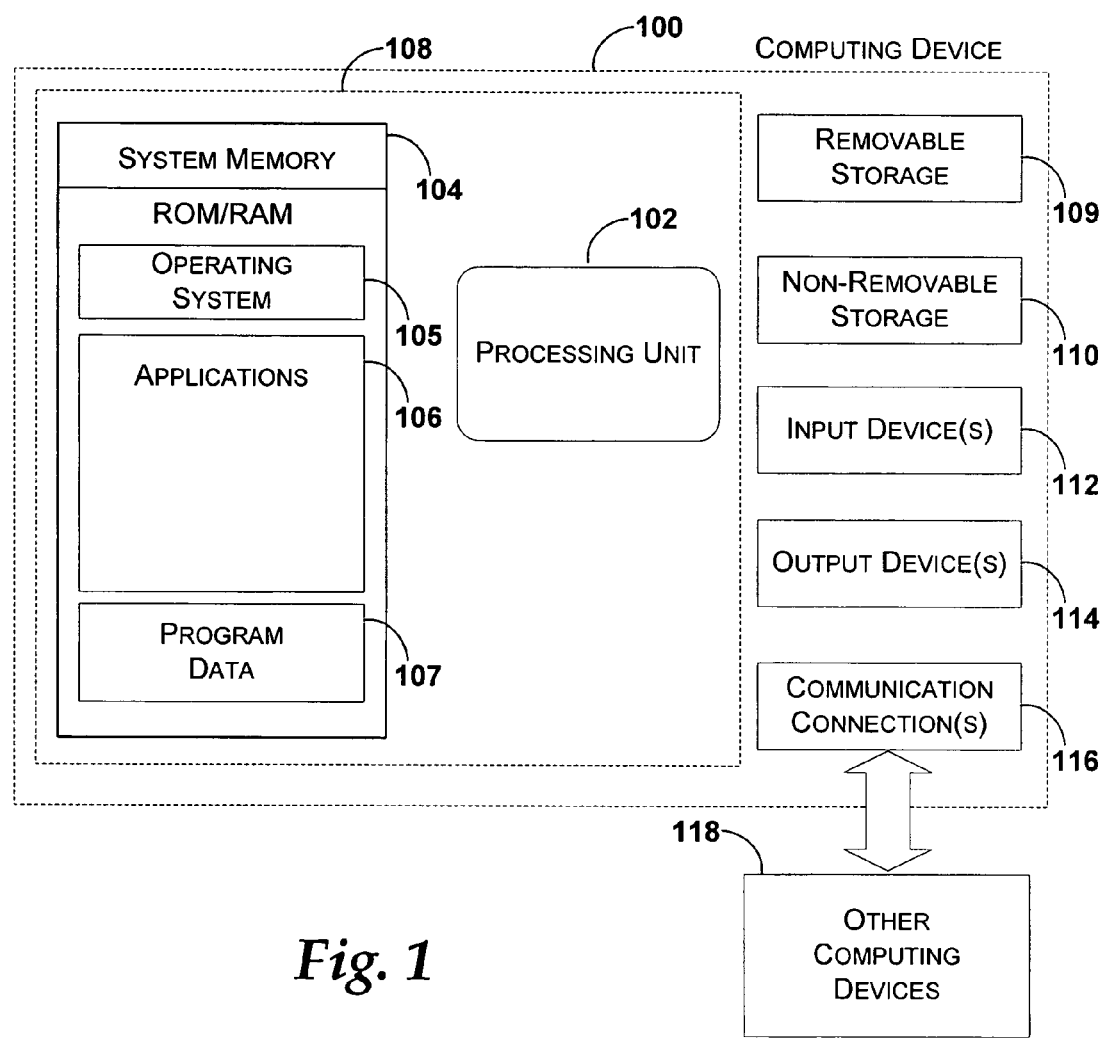
FIG. 1 is an exemplary computing device that may be used in exemplary embodiments of the present invention.

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107. Applications 106 may include, for example, office productivity applications such as Microsoft Excel and other Microsoft Office applications. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification provides a complete description of the manufacture and use of the composition of the invention. Since many embodiments of the invention can be made without departing from the spirit and scope of the invention, the invention resides in the claims hereinafter appended.

What is claimed is:

1. A computer implemented method for providing reversibility of an operation performed by a user of an application program and associated with a modification to an object model of the application program, the method comprising:

determining the top item of a first undo stack of the application program, wherein the first undo stack consists of operations to be undone;

saving the top item;

copying the top item to a second replicated undo stack, wherein the second replicated undo stack consists of operations to be undone;

parsing text associated with an undo menu item that is displayed to the user; and mapping the text to a recognized reversible operation; and
storing into memory the top item of the second replicated undo stack on the first undo stack.

2. The method of claim 1, wherein determining, saving, and copying the top item are performed prior to calling a method of the object model that causes the first undo stack to be cleared.

3. The method of claim 1, wherein placing the top item back onto the first undo stack is performed after calling a method of the object model that causes the first undo stack to be cleared.

4. The method of claim 1, further comprising performing one of an undo operation and a redo operation.

5. The method of claim 1, further comprising maintaining a redo stack.

6. The method of claim 1, wherein the application program is an office productivity application program.

7. The method of claim 1, wherein the application program is a spreadsheet program.

8. A computer-readable storage medium encoded with computer executable instructions for providing reversibility of an operation performed by a user of an application program and associated with a modification to an object model of the application program, the instructions comprising:
   determining the top item of a first undo stack of the application program, wherein the first undo stack consists of operations to be undone; saving the top item;
   copying the top item to a second replicated undo stack, wherein the second replicated undo stack consists of operations to be undone;
   displaying an undo menu item to the user;
   mapping a menu item to a recognized reversible operation; and placing the top item of the second replicated undo stack back onto the first undo stack.

9. The computer-readable medium of claim 8, wherein determining, saving, and copying the top item are performed prior to calling a method of the object model that causes the first undo stack to be cleared.

10. The computer-readable medium of claim 8, wherein placing the top item back onto the first undo stack is performed after calling a method of the object model that causes the first undo stack to be cleared.

11. The computer-readable medium of claim 8, further comprising performing one of an undo operation and a redo operation.

12. The computer-readable medium of claim 8, further comprising maintaining a redo stack.

13. The computer-readable medium of claim 8, wherein the application program is an office productivity application program.

14. The computer-readable medium of claim 11, wherein the application program is a spreadsheet program.

15. A system for providing reversibility of an operation performed by a user of an application program and associated with a modification to an object model of the application program, comprising a computer including a processor that is configured to perform instructions including:
   determining the top item of a first undo stack of the application program, wherein the first undo stack consists of operations to be undone;
   saving the top item;
   copying the top item to a second replicated undo stack, wherein the second replicated undo stack consists of operations to be undone;
   parsing an undo menu item that is displayed to the user;
   associating the undo menu to a recognized reversible operation; and
   placing the top item of the second replicated undo stack back onto the first undo stack.

16. The system of claim 15, wherein an add-in program that supplements the application program is running on the computer.

17. The system of claim 15, wherein the application program is an office productivity application program.

18. The system of claim 15, wherein the application program is a spreadsheet program.

* * * * *